United States Patent
Theobald et al.

(10) Patent No.: US 9,954,792 B2
(45) Date of Patent: Apr. 24, 2018

(54) SHARED FLOW CONTROL CREDITS

(71) Applicant: Intel Corporation, Santa Clara, CA (US)

(72) Inventors: Kevin B. Theobald, Hillsboro, OR (US); Rupin H. Vakharwala, Hillsboro, OR (US); Robert J. Toepfer, Portland, OR (US); Erik G. Hallnor, Beaverton, OR (US); Robert P. Adler, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 384 days.

(21) Appl. No.: 14/578,429

(22) Filed: Dec. 20, 2014

(65) Prior Publication Data

US 2016/0182391 A1 Jun. 23, 2016

(51) Int. Cl.
| | | |
|---|---|---|
| *H04L 12/28* | (2006.01) | |
| *H04L 12/801* | (2013.01) | |
| *H04L 12/46* | (2006.01) | |
| *H04L 12/707* | (2013.01) | |
| *H04L 12/925* | (2013.01) | |
| *H04L 12/911* | (2013.01) | |

(52) U.S. Cl.
CPC .......... *H04L 47/39* (2013.01); *H04L 12/4641* (2013.01); *H04L 45/24* (2013.01); *H04L 47/722* (2013.01); *H04L 47/726* (2013.01); *H04L 47/821* (2013.01)

(58) Field of Classification Search
CPC ... H04L 47/39; H04L 12/4641; H04L 47/726; H04L 45/24; H04L 47/821; H04L 47/722; H04L 12/28
See application file for complete search history.

(56) References Cited

U.S. PATENT DOCUMENTS

| | | | |
|---|---|---|---|
| 6,044,406 A | 3/2000 | Barkey et al. | |
| 6,683,884 B1 | 1/2004 | Howard | |
| 7,447,794 B1 * | 11/2008 | Miller | G06F 13/4217 709/216 |
| 7,643,477 B2 * | 1/2010 | Spink | H04L 47/527 370/363 |
| 7,852,757 B1 * | 12/2010 | Puranik | H04L 47/10 370/229 |
| 7,913,024 B2 * | 3/2011 | Brown | G06F 13/4022 710/114 |
| 8,478,811 B2 | 7/2013 | Garg et al. | |

(Continued)

FOREIGN PATENT DOCUMENTS

WO WO2016-099819 6/2016

OTHER PUBLICATIONS

International Preliminary Report on Patentability and Written Opinion in International Application No. PCT/US2015/062237 dated Jun. 20, 2017, 9 pages.

*Primary Examiner* — Ricky Ngo
*Assistant Examiner* — Lan Huong Truong
(74) *Attorney, Agent, or Firm* — Alliance IP, LLC

(57) ABSTRACT

Traffic control logic is provided to support a plurality of channels on a link. A plurality of reserved credit counters is provided to each identify reserved flow control credits for a corresponding one of the plurality of channels. Further, a shared credit counter is provided to identify shared flow control credits to be shared between two or more of the plurality of virtual channels.

19 Claims, 11 Drawing Sheets

(56) References Cited

U.S. PATENT DOCUMENTS

| | | | |
|---|---|---|---|
| 8,711,867 B2 | 4/2014 | Guo et al. | |
| 9,036,479 B2 * | 5/2015 | Chan | H04L 49/90 370/235 |
| 9,426,083 B2 * | 8/2016 | Ziegler | H04L 49/505 |
| 2002/0146022 A1 * | 10/2002 | Van Doren | H04L 49/506 370/412 |
| 2005/0016977 A1 * | 1/2005 | Taaler | B23K 9/173 219/137.61 |
| 2005/0251612 A1 * | 11/2005 | Creta | G06F 13/36 710/316 |
| 2006/0101179 A1 * | 5/2006 | Lee | G06F 13/364 710/113 |
| 2008/0273545 A1 * | 11/2008 | Sgouros | H04L 41/5022 370/412 |
| 2008/0300992 A1 * | 12/2008 | Wang | G06F 13/385 705/16 |
| 2013/0051397 A1 * | 2/2013 | Guo | H04L 45/00 370/400 |
| 2015/0003247 A1 * | 1/2015 | Mejia | H04L 47/12 370/235 |
| 2016/0149639 A1 * | 5/2016 | Pham | H04B 10/0773 398/16 |

* cited by examiner

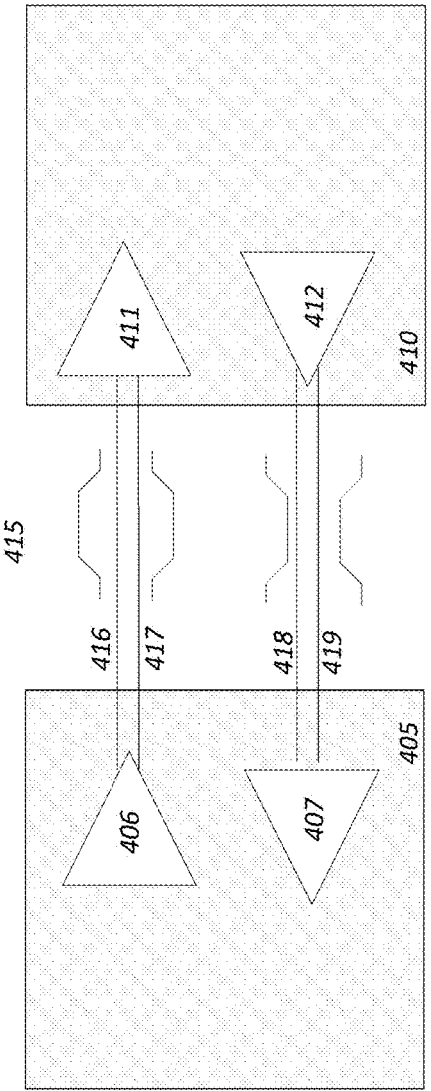

SHARED FLOW CONTROL CREDITS

FIELD

This disclosure pertains to computing system, and in particular (but not exclusively) to flow control in computing systems.

BACKGROUND

Advances in semi-conductor processing and logic design have permitted an increase in the amount of logic that may be present on integrated circuit devices. As a corollary, computer system configurations have evolved from a single or multiple integrated circuits in a system to multiple cores, multiple hardware threads, and multiple logical processors present on individual integrated circuits, as well as other interfaces integrated within such processors. A processor or integrated circuit typically comprises a single physical processor die, where the processor die may include any number of cores, hardware threads, logical processors, interfaces, memory, controller hubs, etc.

As a result of the greater ability to fit more processing power in smaller packages, smaller computing devices have increased in popularity. Smartphones, tablets, ultrathin notebooks, and other user equipment have grown exponentially. However, these smaller devices are reliant on servers both for data storage and complex processing that exceeds the form factor. Consequently, the demand in the high-performance computing market (i.e. server space) has also increased. For instance, in modern servers, there is typically not only a single processor with multiple cores, but also multiple physical processors (also referred to as multiple sockets) to increase the computing power. But as the processing power grows along with the number of devices in a computing system, the communication between sockets and other devices becomes more critical.

In fact, interconnects have grown from more traditional multi-drop buses that primarily handled electrical communications to full blown interconnect architectures that facilitate fast communication. Unfortunately, as the demand for future processors to consume at even higher-rates corresponding demand is placed on the capabilities of existing interconnect architectures.

BRIEF DESCRIPTION OF THE DRAWINGS

FIG. 3 illustrates an embodiment of a request or packet to be generated or received within an interconnect architecture.

FIG. 4 illustrates an embodiment of a transmitter and receiver pair for an interconnect architecture.

Like reference numbers and designations in the various drawings indicate like elements.

DETAILED DESCRIPTION

Figure 1:
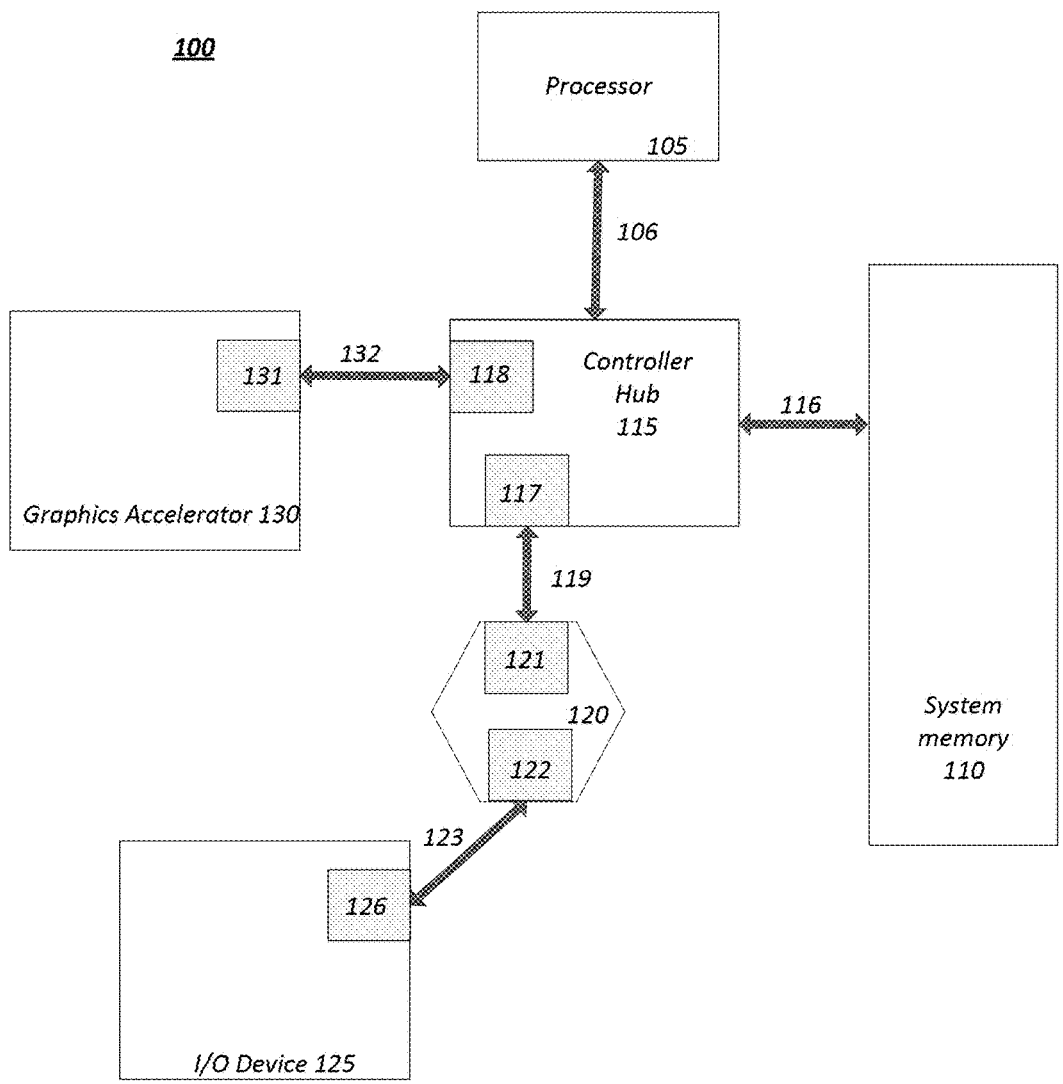
FIG. 1 illustrates an embodiment of a computing system including an interconnect architecture.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Referring to FIG. 1, an embodiment of a fabric composed of point-to-point Links that interconnect a set of components is illustrated. System 100 includes processor 105 and system memory 110 coupled to controller hub 115. Processor 105 includes any processing element, such as a microprocessor, a host processor, an embedded processor, a co-processor, or other processor. Processor 105 is coupled to controller hub 115 through front-side bus (FSB) 106. In one embodiment, FSB 106 is a serial point-to-point interconnect as described below. In another embodiment, link 106 includes a serial, differential interconnect architecture that is compliant with different interconnect standard.

System memory 110 includes any memory device, such as random access memory (RAM), non-volatile (NV) memory, or other memory accessible by devices in system 100. System memory 110 is coupled to controller hub 115 through memory interface 116. Examples of a memory interface include a double-data rate (DDR) memory interface, a dual-channel DDR memory interface, and a dynamic RAM (DRAM) memory interface.

In one embodiment, controller hub 115 is a root hub, root complex, or root controller in a Peripheral Component Interconnect Express (PCIe or PCIE) interconnection hierarchy. Examples of controller hub 115 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 105, while controller 115 is to communicate with I/O devices, in a similar manner as described below. In some embodiments, peer-to-peer routing is optionally supported through root complex 115.

Here, controller hub 115 is coupled to switch/bridge 120 through serial link 119. Input/output modules 117 and 121, which may also be referred to as interfaces/ports 117 and 121, include/implement a layered protocol stack to provide communication between controller hub 115 and switch 120. In one embodiment, multiple devices are capable of being coupled to switch 120.

Switch/bridge 120 routes packets/messages from device 125 upstream, i.e. up a hierarchy towards a root complex, to controller hub 115 and downstream, i.e. down a hierarchy away from a root controller, from processor 105 or system memory 110 to device 125. Switch 120, in one embodiment, is referred to as a logical assembly of multiple virtual PCI-to-PCI bridge devices. Device 125 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 125 may include a PCIe to PCI/PCI-X bridge to support legacy or other version PCI devices. Endpoint devices in PCIe are often classified as legacy, PCIe, or root complex integrated endpoints.

Graphics accelerator 130 is also coupled to controller hub 115 through serial link 132. In one embodiment, graphics accelerator 130 is coupled to an MCH, which is coupled to an ICH. Switch 120, and accordingly I/O device 125, is then coupled to the ICH. I/O modules 131 and 118 are also to implement a layered protocol stack to communicate between graphics accelerator 130 and controller hub 115. Similar to the MCH discussion above, a graphics controller or the graphics accelerator 130 itself may be integrated in processor 105.

Figure 2:
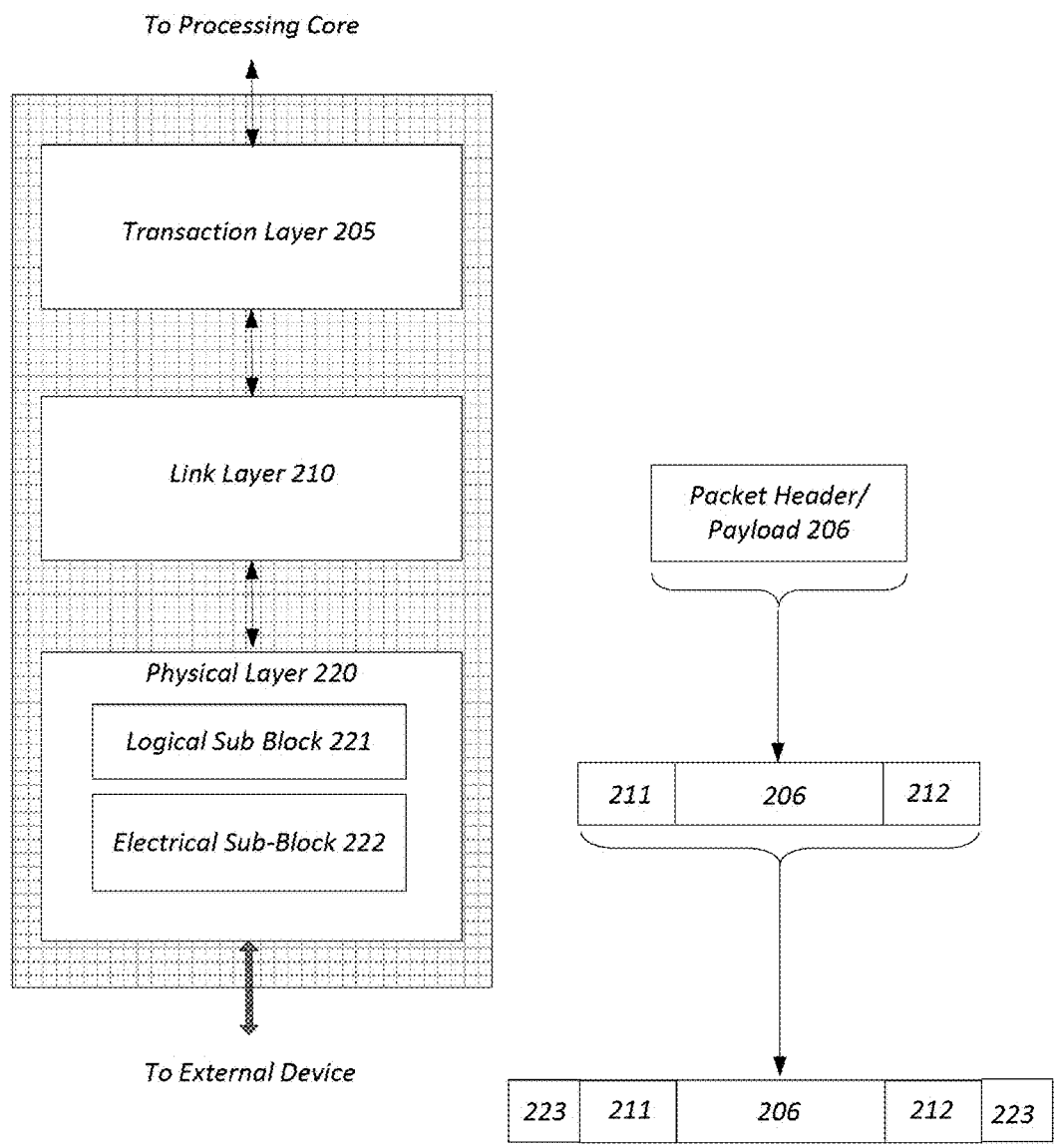
FIG. 2 illustrates an embodiment of a interconnect architecture including a layered stack.

Turning to FIG. 2 an embodiment of a layered protocol stack is illustrated. Layered protocol stack 200 includes any form of a layered communication stack, such as a Quick Path Interconnect (QPI) stack, a PCie stack, a next generation high performance computing interconnect stack, or other layered stack. Although the discussion immediately below in reference to FIGS. 1-4 are in relation to a PCIe stack, the same concepts may be applied to other interconnect stacks. In one embodiment, protocol stack 200 is a PCIe protocol stack including transaction layer 205, link layer 210, and physical layer 220. An interface, such as interfaces 117, 118, 121, 122, 126, and 131 in FIG. 1, may be represented as communication protocol stack 200. Representation as a communication protocol stack may also be referred to as a module or interface implementing/including a protocol stack.

PCI Express uses packets to communicate information between components. Packets are formed in the Transaction Layer 205 and Data Link Layer 210 to carry the information from the transmitting component to the receiving component. As the transmitted packets flow through the other layers, they are extended with additional information necessary to handle packets at those layers. At the receiving side the reverse process occurs and packets get transformed from their Physical Layer 220 representation to the Data Link Layer 210 representation and finally (for Transaction Layer Packets) to the form that can be processed by the Transaction Layer 205 of the receiving device.

Transaction Layer

In one embodiment, transaction layer 205 is to provide an interface between a device's processing core and the interconnect architecture, such as data link layer 210 and physical layer 220. In this regard, a primary responsibility of the transaction layer 205 is the assembly and disassembly of packets (i.e., transaction layer packets, or TLPs). The translation layer 205 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 205. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 205 assembles packet header/payload 206. Format for current packet headers/payloads may be found in the PCIe specification at the PCIe specification website.

Quickly referring to FIG. 3, an embodiment of a PCIe transaction descriptor is illustrated. In one embodiment, transaction descriptor 300 is a mechanism for carrying transaction information. In this regard, transaction descriptor 300 supports identification of transactions in a system. Other potential uses include tracking modifications of default transaction ordering and association of transaction with channels.

Transaction descriptor 300 includes global identifier field 302, attributes field 304 and channel identifier field 306. In the illustrated example, global identifier field 302 is depicted comprising local transaction identifier field 308 and source identifier field 310. In one embodiment, global transaction identifier 302 is unique for all outstanding requests.

According to one implementation, local transaction identifier field 308 is a field generated by a requesting agent, and it is unique for all outstanding requests that require a completion for that requesting agent. Furthermore, in this example, source identifier 310 uniquely identifies the requestor agent within a PCIe hierarchy. Accordingly, together with source ID 310, local transaction identifier 308 field provides global identification of a transaction within a hierarchy domain.

Attributes field 304 specifies characteristics and relationships of the transaction. In this regard, attributes field 304 is potentially used to provide additional information that allows modification of the default handling of transactions. In one embodiment, attributes field 304 includes priority field 312, reserved field 314, ordering field 316, and no-snoop field 318. Here, priority sub-field 312 may be modified by an initiator to assign a priority to the transaction. Reserved attribute field 314 is left reserved for future, or vendor-defined usage. Possible usage models using priority or security attributes may be implemented using the reserved attribute field.

In this example, ordering attribute field 316 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 318 is utilized to determine if transactions are snooped. As shown, channel ID Field 306 identifies a channel that a transaction is associated with.

Link Layer

Link layer 210, also referred to as data link layer 210, acts as an intermediate stage between transaction layer 205 and the physical layer 220. In one embodiment, a responsibility of the data link layer 210 is providing a reliable mechanism for exchanging Transaction Layer Packets (TLPs) between two components a link. One side of the Data Link Layer 210 accepts TLPs assembled by the Transaction Layer 205, applies packet sequence identifier 211, i.e. an identification number or packet number, calculates and applies an error detection code, i.e. CRC 212, and submits the modified TLPs to the Physical Layer 220 for transmission across a physical to an external device.

Physical Layer

In one embodiment, physical layer 220 includes logical sub block 221 and electrical sub-block 222 to physically transmit a packet to an external device. Here, logical sub-block 221 is responsible for the "digital" functions of Physical Layer 221. In this regard, the logical sub-block includes a transmit section to prepare outgoing information for transmission by physical sub-block 222, and a receiver section to identify and prepare received information before passing it to the Link Layer 210.

Physical block 222 includes a transmitter and a receiver. The transmitter is supplied by logical sub-block 221 with symbols, which the transmitter serializes and transmits onto to an external device. The receiver is supplied with serialized symbols from an external device and transforms the received signals into a bit-stream. The bit-stream is de-serialized and supplied to logical sub-block 221. In one embodiment, an 8b/10b transmission code is employed, where ten-bit symbols are transmitted/received. Here, special symbols are used to frame a packet with frames 223. In addition, in one example, the receiver also provides a symbol clock recovered from the incoming serial stream.

As stated above, although transaction layer 205, link layer 210, and physical layer 220 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Referring next to FIG. 4, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 406/411 and a receive pair 412/407. Accordingly, device 405 includes transmission logic 406 to transmit data to device 410 and receiving logic 407 to receive data from device 410. In other words, two transmitting paths, i.e. paths 416 and 417, and two receiving paths, i.e. paths 418 and 419, are included in a PCIe link.

A transmission path refers to any path for transmitting data, such as a transmission line, a copper line, an optical line, a wireless communication channel, an infrared communication link, or other communication path. A connection between two devices, such as device 405 and device 410, is referred to as a link, such as link 415. A link may support one lane each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 5:
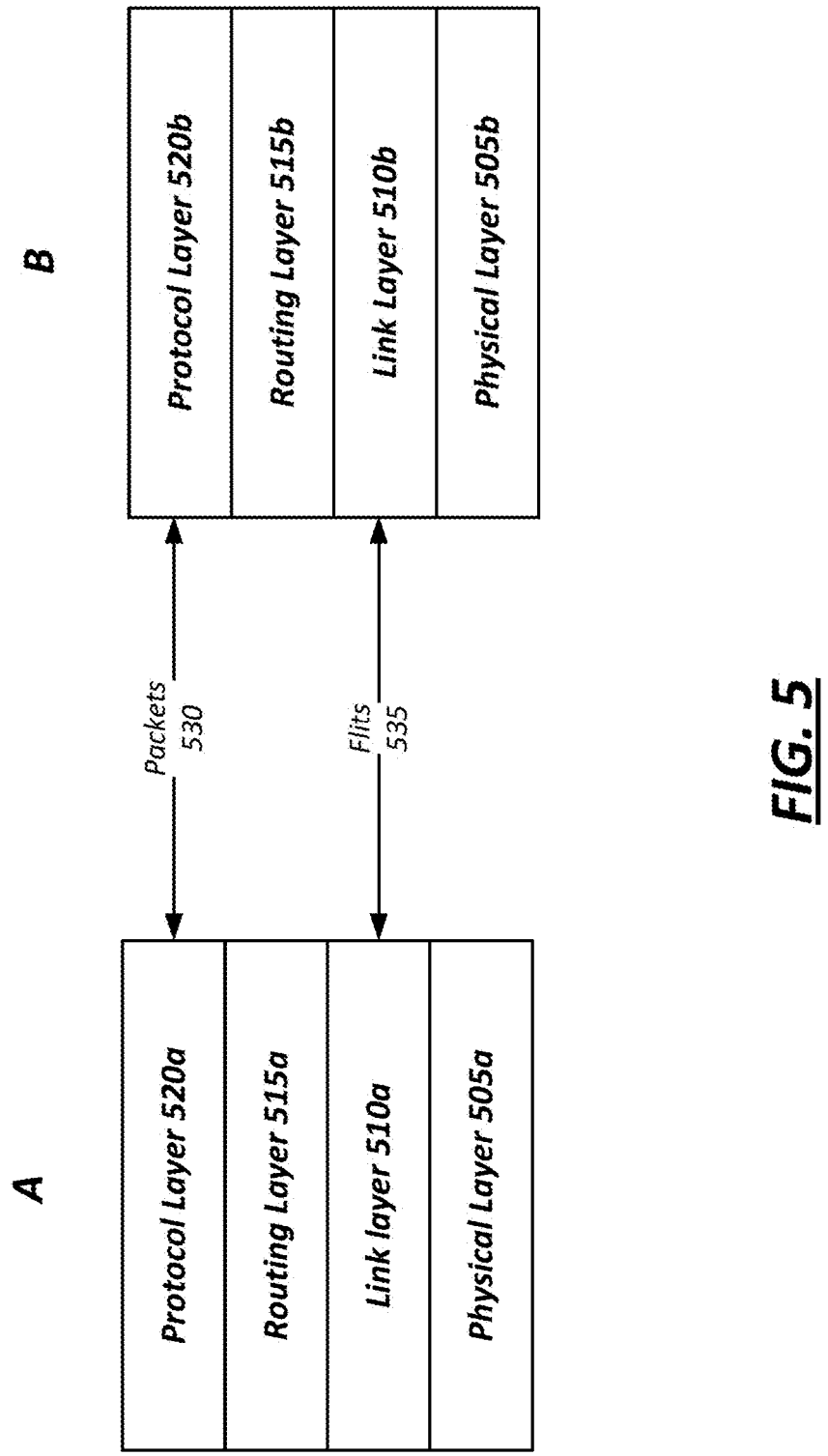
FIG. 5 illustrates an embodiment of a layered protocol.

In some instances, an interconnect architecture or technologies associated with one or more of the protocols supported by a device can include a definition of a layered protocol architecture, including in some examples, protocol layers (coherent, non-coherent, and, optionally, other memory based protocols), a routing layer, a link layer, and a physical layer. FIG. 5 illustrates an embodiment of one example of a layered protocol stack. In some implementations, at least some of the layers illustrated in FIG. 5 may be optional. Each layer deals with its own level of granularity or quantum of information (e.g., the protocol layer 505a,b with packets 530, the link layer 510a,b with flits 535, etc.). Note that a packet, in some embodiments, may include partial flits, a single flit, or multiple flits based on the implementation.

Physical layer 505a,b, in one embodiment, can be responsible for the fast transfer of information on the physical medium (electrical or optical etc.). The physical link can be point-to-point between two Link layer entities, such as layer 505a and 505b. The Link layer 510a,b can abstract the Physical layer 505a,b from the upper layers and provides the capability to reliably transfer data (as well as requests) and manage flow control between two directly connected entities. The Link Layer can also be responsible for virtualizing the physical channel into multiple virtual channels and message classes. The Protocol layer 520a,b relies on the Link layer 510a,b to map protocol messages into the appropriate message classes and virtual channels before handing them to the Physical layer 505a,b for transfer across the physical links. Link layer 510a,b may support multiple messages, such as a request, snoop, response, writeback, non-coherent data, among other examples.

A Physical layer 505a,b (or PHY) can be implemented above the electrical layer (i.e. electrical conductors connecting two components) and below the link layer 510a,b, as illustrated in FIG. 5. The Physical layer and corresponding logic can reside on each agent and connects the link layers on two agents (A and B) separated from each other (e.g. on devices on either side of a link). The local and remote electrical layers are connected by physical media (e.g. wires, conductors, optical, etc.). The Physical layer 505a,b, in one embodiment, has two major phases, initialization and operation. During initialization, the connection is opaque to the link layer and signaling may involve a combination of timed states and handshake events. During operation, the connection is transparent to the link layer and signaling is at a speed, with all lanes operating together as a single link. During the operation phase, the Physical layer transports flits from agent A to agent B and from agent B to agent A. The connection is also referred to as a link and abstracts some physical aspects including media, width and speed from the link layers while exchanging flits and control/status of current configuration (e.g. width) with the link layer.

In one embodiment, Link layer 510a,b can be implemented so as to provide reliable data transfer between two protocol or routing entities. The Link layer can abstract Physical layer 505a,b from the Protocol layer 520a,b, and can be responsible for the flow control between two protocol agents (A, B), and provide virtual channel services to the Protocol layer (Message Classes) and Routing layer (Virtual Networks). The interface between the Protocol layer 520a,b and the Link Layer 510a,b can typically be at the packet level. In one embodiment, the smallest transfer unit at the Link Layer is referred to as a flit which a specified number of bits, such as 192 bits or some other denomination. In addition, the Link Layer 510a,b may be logically broken into two parts, a sender and a receiver. A sender/receiver pair on one entity may be connected to a receiver/sender pair on another entity. Flow Control can be performed on either or both a flit and a packet basis.

In one embodiment, Routing layer 515a,b can provide a flexible and distributed method to route transactions from a source to a destination. The scheme is flexible since routing algorithms for multiple topologies may be specified through programmable routing tables at each router (the programming in one embodiment is performed by firmware, software, or a combination thereof). The routing functionality may be distributed; the routing may be done through a series of routing steps, with each routing step being defined through a lookup of a table at either the source, intermediate, or destination routers. The lookup at a source may be used to inject a packet into the fabric. The lookup at an intermediate router may be used to route a packet from an input port to an output port. The lookup at a destination port may be used to target the destination protocol agent. Note that the Routing layer, in some implementations, can be thin since the routing tables, and, hence the routing algorithms, may not be specifically defined by specification. This can allow for flexibility and a variety of usage models, including flexible platform architectural topologies to be defined by the system implementation. The Routing layer 515a,b relies on the Link layer 510a,b for providing the use of up to three (or more) virtual networks (VNs)—in one example, two deadlock-free VNs, VN0 and VN1 with several message classes defined in each virtual network.

In one embodiment, a Protocol layer 520a,b can be provided to manage the communication of transactions involving packets and packetized data streams. Protocol layer 520a,b, in some implementations, can support agents caching lines of data from memory. An agent wishing to cache memory data may use the protocol to read the line of data to load into its cache. An agent wishing to modify a line of data in its cache may use the coherence protocol to acquire ownership of the line before modifying the data. After modifying a line, an agent may follow protocol requirements of keeping it in its cache until it either writes the line back to memory or includes the line in a response to an external request, among other examples and features.

In one example, an on-chip system fabric can be provided to serve as a common intellectual property (IP) block interface architecture and enable IP reuse. Interface signals and architecture can be defined for the fabric to provide interface instantiation, arbitration, flow control address decode capability, error handling, power management functions, and other capabilities such that IP blocks designed to be compliant to with the on-chip system fabric can be reused with minimal incremental effort across a wide range of products and use cases.

A system on chip (SoC) architecture can include devices, such as routers, to implement the fabric. Endpoint devices, or agents, can also be provided that are compliant with an interface protocol of the on-chip system fabric. Such agents can connect to the on-chip system fabric and thereby communicate with other agents connected to the fabric. The fabric topology itself can be product specific. However, the on-chip system fabric can define an interface protocol between the agent and the fabric. Agents, and the interface protocol, can be reused across various implementations of systems that utilize the on-chip system fabric architecture.

Figure 6:
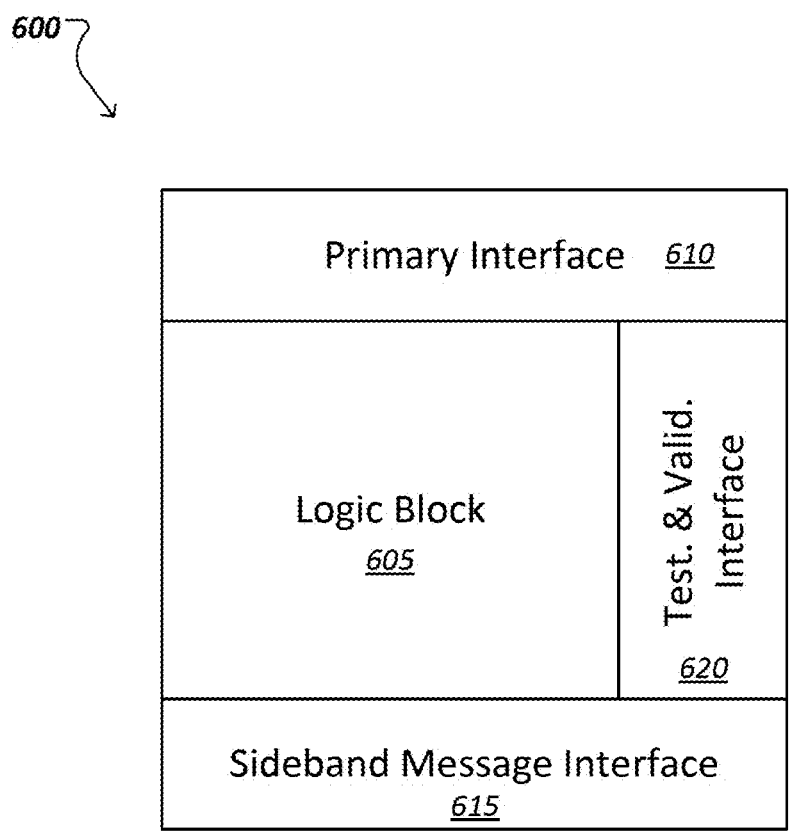
FIG. 6 illustrates an embodiment of an on-chip agent.

Turning to FIG. 6, a simplified block diagram is shown of an example agent device. In one example, an example on-chip fabric architecture can define three independent interfaces for each agent device. For instance, an agent 600 can include a logic block to define functionality of the device 600. The agent 600 can further include an arbitrary number (even zero) of primary interfaces (e.g., 605) and an arbitrary number (even zero) of sideband interfaces (e.g., 610). A validation and testing interface (e.g., 615) can be optionally included in at least some designs. A primary interface can serve as the high performance interface for command and data transfers between devices. This interface can include a master interface that initiates transactions and a target interface that receives transactions and related data. An agent can support both master and target interfaces. The primary interface can also support the concept of distinct channels to provide independent data flows in an on-chip system. Each independent channel can be a channel of the on-chip system fabric. The on-chip system fabric can define the signaling and protocol to transfer requests of different types from the various ports and/or virtual channels supported by an IP block (e.g., agent) from the master (source) to the target (destination) over the on-ship system fabric.

Sideband interfaces (e.g., 610) can serve as the standard interface for communicating all out-of-band information, including errors, interrupts, power management, etc. within the fabric. The sideband message interface can serve to replace (and eliminate) special purpose wires that can jeopardize reuse of IP blocks (e.g., that possess such dedicated wires). A sideband message interface 610 can standardize out-of-band communications. A standard bus definition and message encoding scheme can be defined to promote modularity and reduce the validation requirement for IP block reuse across various designs. Further, a sideband message interface (e.g., 610) can be a point-to-point network with endpoints, routers, and a network to interconnect the routers. In some implementations, an endpoint agent device supporting a sideband interface can always be connected to an on-chip system fabric sideband router.

Figure 7:
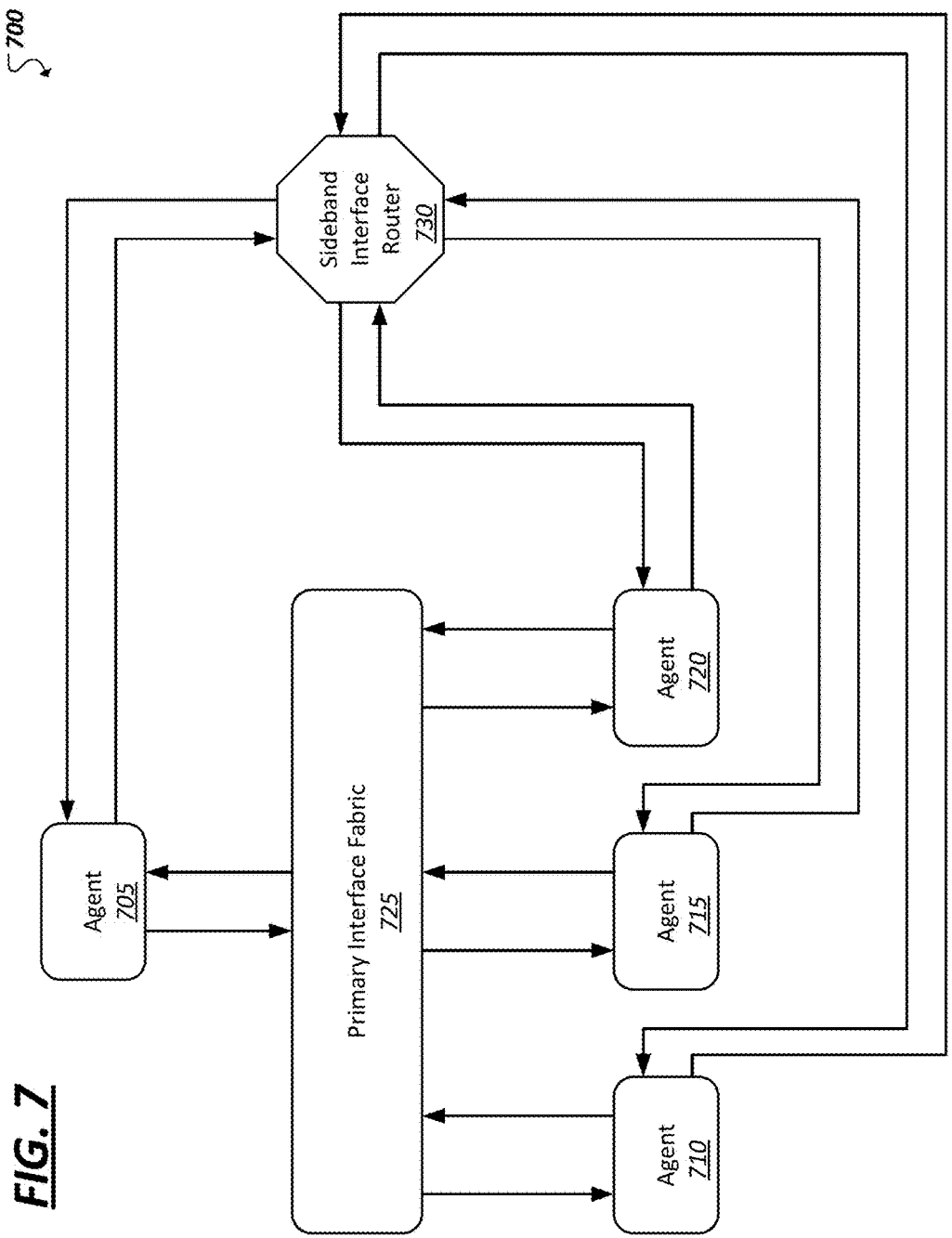
FIG. 7 is a simplified block diagram of an on-chip system fabric.

Turning to FIG. 7, a simplified block diagram 700 is shown illustrating an example fabric, including multiple agents 705, 710, 715, 720 interconnected through a fabric that include a primary interface fabric 725 (that may include one more fabric devices) and a sideband fabric that includes one or more sideband messaging interface routers (e.g., 730). Agents (e.g., 705, 710, 715, 720) can utilize their primary interfaces and the primary interface fabric 725 to communicate in-band communications. For instance, in-band communications can be include transactions between an agent and a host CPU, peer transactions between agents, among other example. All transaction types including memory, I/O, configuration, and in-band messages may be delivered over the primary interface. Communications over the primary interface can be according to a credit-based flow control protocol or scheme in some instances.

In some implementations, credit-based flow control can be utilized to multiplex multiple channels (e.g., virtual channels) over a single physical link. Two devices (e.g., integrated circuit, processor, node, IP block, etc.) can be interconnected and credits can be used for flow control over the communication channel between the interconnected devices. In the basic case, a transmitter (or "master") can transmit packets to a receiver (or "target") over a unidirectional channel. The receiver can have buffer space to accept one or more packets from the other device. During initialization, the receiver can give the transmitter one or more credits, corresponding to the available space in the buffer space of the receiver. When the transmitter has a credit, the transmitter can send a packet to the receiver without first asking permission of the requester. The credit can represent a guarantee that free buffer space exists in receiver for the packet. The packet can include data of a transaction, control command, request, or other communications. When the transmitter sends a packet to the receiver, one of the transmitter's credits is consumed. The transmitter can track the number of packets it has through one or more counters. Accordingly, when the transmitter sends a packet (or flit or other piece of data corresponding to a credit) the transmitter can decrement its corresponding credit counter. If the counter goes to 0, the transmitter has no more credits and can be barred from sending any further packets to the receiver until it is allocated another credit from the receiver. For instance, when the receiver completes its processing of a previously-received packet and de-allocates the corresponding space in its buffer, it can send, or "return", a credit back to the transmitter, thereby notifying the transmitter that the receiver can accept another packet from the transmitter.

In some cases, a device can support multiple different channels on a single physical interface. For instance, virtual channels can be defined to handle certain types, or classes, of traffic. Further, a certain quality of service can be guaranteed to each class. To avoid any one class monopolizing bandwidth of the link, credits can likewise be used to facilitate multiplexing of the multiple channels on the link. For instance, bandwidth of a channel can be divided between multiple channels by assigning, or reserving, to each virtual channel a corresponding amount of credits. One traffic class, and corresponding VC, can have general or temporary priority over other VCs in some cases in accordance with an algorithm for prioritizing traffic classes on the link. However, when a preferred VC runs out of credits it is forced to wait until credits are returned, creating a window for traffic of other VCs (i.e., that still have credits to use), among other example implementations.

Still further, in addition to assigning credits on a per-channel basis, some implementations can assign credits on a request-type, transaction-type, or packet-type basis. For instance, separate queues and associated credits can be provided for each of a set of request types. In one example, request types can include posted requests (e.g., messages and memory writes), non-posted requests (e.g., reads, I/O writes, configuration writes, atomic operations), and completions (e.g., associated with corresponding non-posted requests). Further, in some implementations, each channel can have corresponding queues for each of the request types. For instance, in a system providing M channels and N request types per channel, M*N separate queues and flow control credits can be designated to provide credit-based flow control for the link.

A shortcoming of traditional credit-based flow control solutions in conventional queue-based protocols that reserve credits on a per-queue basis (e.g., for a set of queues corresponding to supported channels, request type, packet type, etc.) is that if there is currently no traffic corresponding to that queue, these credits (and the receiver's buffer resources) are not otherwise available for traffic destined for another of the queues. For instance, if a particular VC is not being used, its credits are also not being used and this portion of the receiver's buffer goes unused while traffic is potentially intermittently suspended on other VCs due to a lack of available credits for their particular VC, among other examples.

In one implementation, a credit-based flow control scheme can be adopted that reserves some of the resources of a receiver buffer for specific queues, such as for specific VCs, while maintaining another portion of the resources that are to be shared by two or more (or all) of the queues. Resources can be managed using a counter-based crediting mechanism to guarantee a minimum level of service for each queue while providing "extra" credits for use by queues when their dedicated credits have been exhausted.

Figure 8:
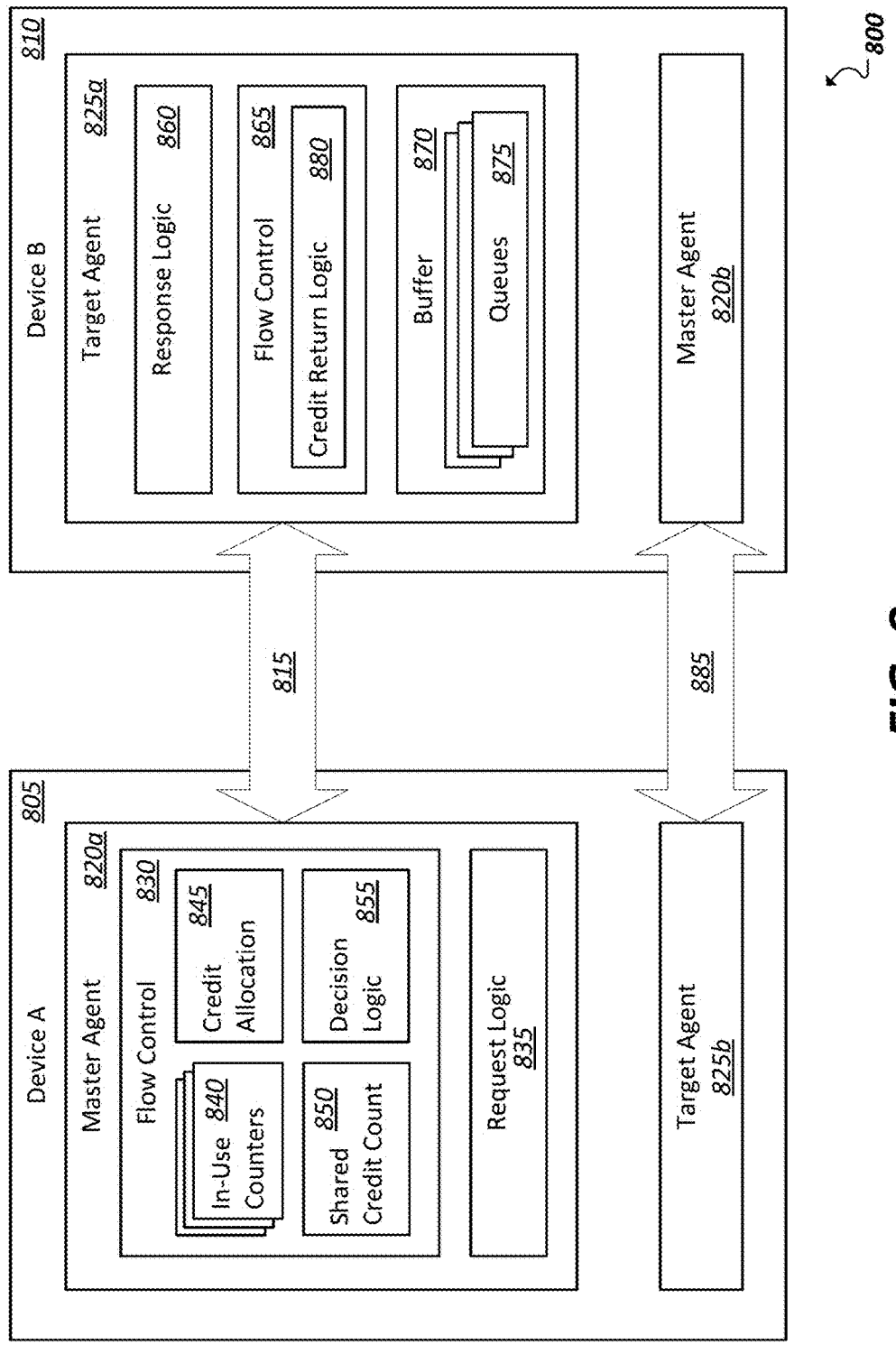
FIG. 8 illustrates a simplified block diagram illustrating a channel between two devices.

Turning to FIG. 8, a simplified block diagram 800 is shown illustrating two devices 805, 810 that can be connected by at least one physical link to communicate over a channel 815 in accordance with a queue-based protocol. In some transactions involving the devices 805, 810, one of the devices can act as the master/transmitter and the other as the target/receiver. Accordingly, in the example of FIG. 8, device 805 can include a master agent 820a that includes logic implemented at least partially in hardware circuitry for transmitting data to target agent 825a at device 810.

In one example implementation, master agent 820a can include flow control logic 830 and request generation logic 835. The request logic 835 can generate a request embodied as one or more packets to be sent to device 810. Flow control logic 830 can determine when the generated request can be sent to device 810. Flow control logic 830 can support the use of shared credits that can supplement dedicated credits assigned to the various virtual channels supported by the master agent 820a. In one example, flow control logic 830 can include in-use counters 840 to track the credits used by each channel, a credit allocation module 845 to track the reserved, or private, credits assigned to each channel, and a shared credit counter 850 to count the shared credits available to the collection of channels supported by the master agent 820a. These counters and modules (e.g., 840, 845, 850) can be used by decision logic 855 to determine conditions when data generated by request logic 835 for any one of a set of supported traffic classes can be sent on a corresponding virtual channel.

The target logic 825a can include logic for handling requests from a device 805. For instance, the target agent 825a can include response logic 860, flow control logic 865, and a buffer 870 for use in hosting queues 875 (or slots) for receiving requests from the device 805. Flow control logic 865 of the target 825a can include credit return logic 880 for identifying credits that are to be returned for various virtual channels of the master 820a in response to queues 875 being emptied within buffer 870.

In some implementations, two devices (e.g., 805, 810) connected by one or more links can each include respective master (e.g., 820a, 820b) and target (e.g., 825a, 825b) logic such that the device (e.g., 805) can serve as a master in some transactions (over channel 815) and target in others (over channel 885). In other instances, a device may only function as a master or a target in transactions with another device. Channels 815, 885 can be implemented on separate physical links or the same physical link. In the case where a single bi-directional link is used, packets flowing from 820b to 825b can share the same wires as credits returning from 825a to 820a, and would have a separate arbitration scheme to decide which goes first. Alternatively, the wires could be bidirectional, with a separate mechanism to decide who gets to transmit.

Figure 9:
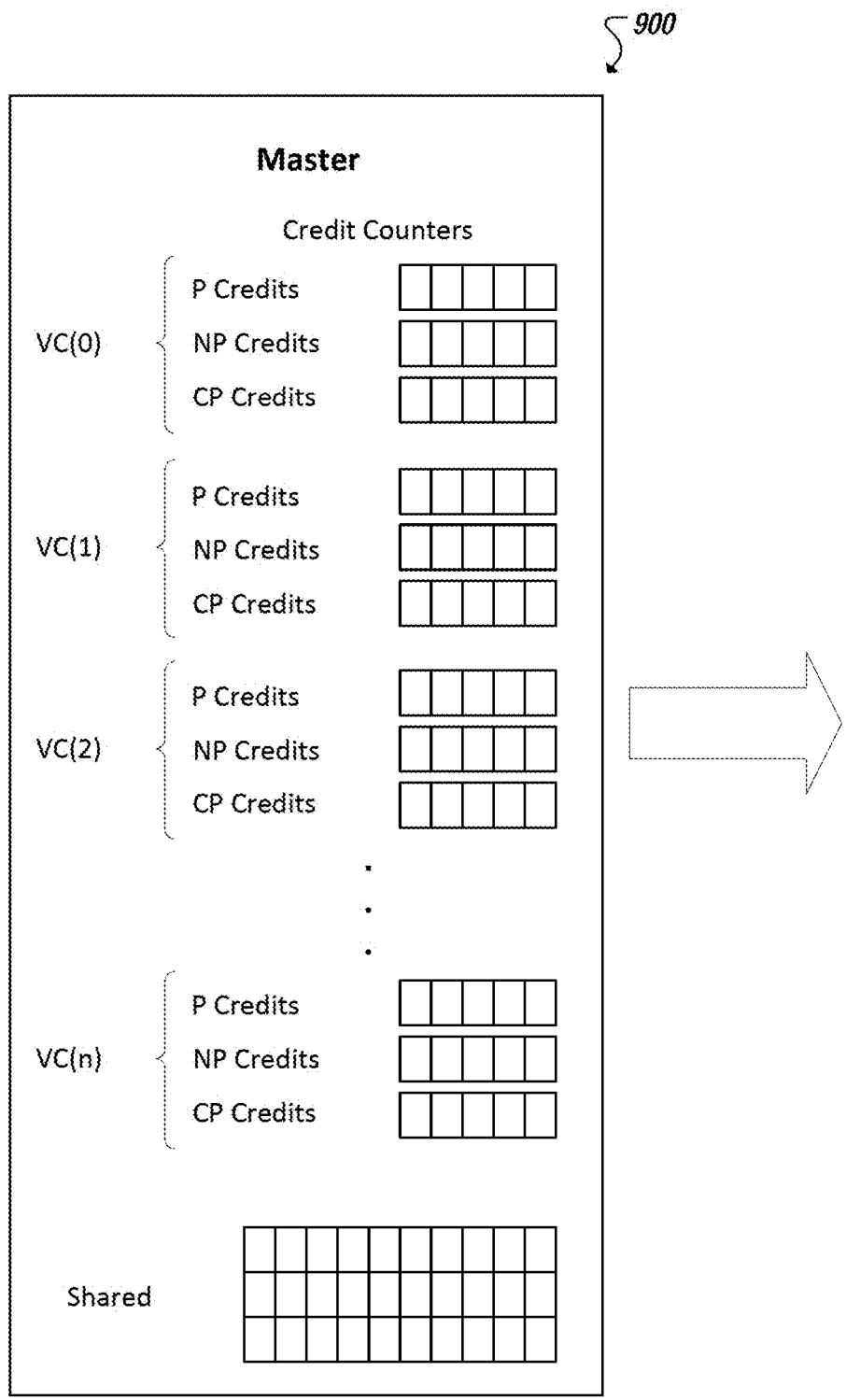
FIG. 9 illustrates a simplified block diagram of flow control credit counters of an example agent.

Turning to FIG. 9, a simplified block diagram 900 is shown illustrating one embodiment of a master agent 820 configured to support a credit-based flow control protocol that includes use of both dedicated queue credits and shared credits. For instance, a master 820 can include credit counters corresponding to each of a set of queues. A queue, or slot, can correspond to a portion of the buffer of the target that has been reserved (e.g., during credit initialization) for a particular type of traffic. For instance, a reserved queue can be provided for each combination of virtual channel (or traffic class) and request (or packet) type. For instance, a queue for posted request packets sent over virtual channel 0 can correspond to a first queue and a credit counter (e.g., 905) can be provided to track credits involving the first queue. Another queue can correspond to the portion of the receiver buffer reserved for non-posted request packets sent over virtual channel 2 and a corresponding counter (e.g., 910) can be maintained, and so on. In this example, where n virtual channels have been provided each with three supported request types, 3n counters may be provided to track credits for packets sent to each queue using the channel 815. The three supported request types in the example of FIG. 9 can be Posted request types (P), Non-Posted request types (NP), and Completion request types (C). Other request types can be included in other examples.

Further, a pool of shared credits can be provided that corresponds to at least a portion of the receiver buffer remaining after reservations have been made for each of the queues. The shared credits, in some implementations, may be shared for use in connection with any of the queues. In other instances, the master/transmitter and/or target/receiver can designate that only a subset of the queues are to use the shared credit pool, among other examples. A shared credit counter 915 can be provided to track usage and/or availability of credits in the shared credit pool.

In some implementations, the amount of buffer space reserved to each queue can be fixed. In other cases the size of the queues can be configurable. For instance, the number of reserved credits for each VC/request type combination can be changed (e.g., by software) to assist in optimizing assignment of credits, such that queues for which there is more demand (or for which more demand has been observed during operation of the channel) are assigned more reserved credits than those that are more seldom used. In one implementation, a credit initialization procedure (e.g., after a reset) can be used to determine, and in some cases negotiate, the amount of the buffer to be reserved to each queue. Relatedly, the size of the shared buffer pool can also be configurable and adjustable, such that it can be fine-tuned to the observed characteristics of the channel. Additionally, a credit for one queue may indicate reservation of a larger portion of the receiver buffer than the credit for another queue (e.g., to reflect that the packet size for one request type or traffic class may be larger than others), among other examples.

In one implementation, each packet sent is in a corresponding one of multiple VCs and is tagged with the VC's number. In order to guarantee a minimal throughput or quality of service to a given VC, slots in the receiver buffer may be reserved for that VC. For instance, if a particular VC is reserved P slots (P representing the "private" count), the minimum guaranteed average throughput for the particular VC can be considered to be P divided by the average time needed by the receiver to process packets sent over the particular VC (assuming enough packets are available on the VC to reach this level). The reserved slots allow a packet for a particular VC to enter the receiver even when all non-reserved (i.e., shared) slots are filled, unless all slots reserved for the particular VC are also filled. When the receiver signals the master that it has freed a slot, it can include an indication in the credit return signal identifying the VC from which the released packet was received so that the transmitter knows which counter to increment (based on the credit return).

Figure 10:
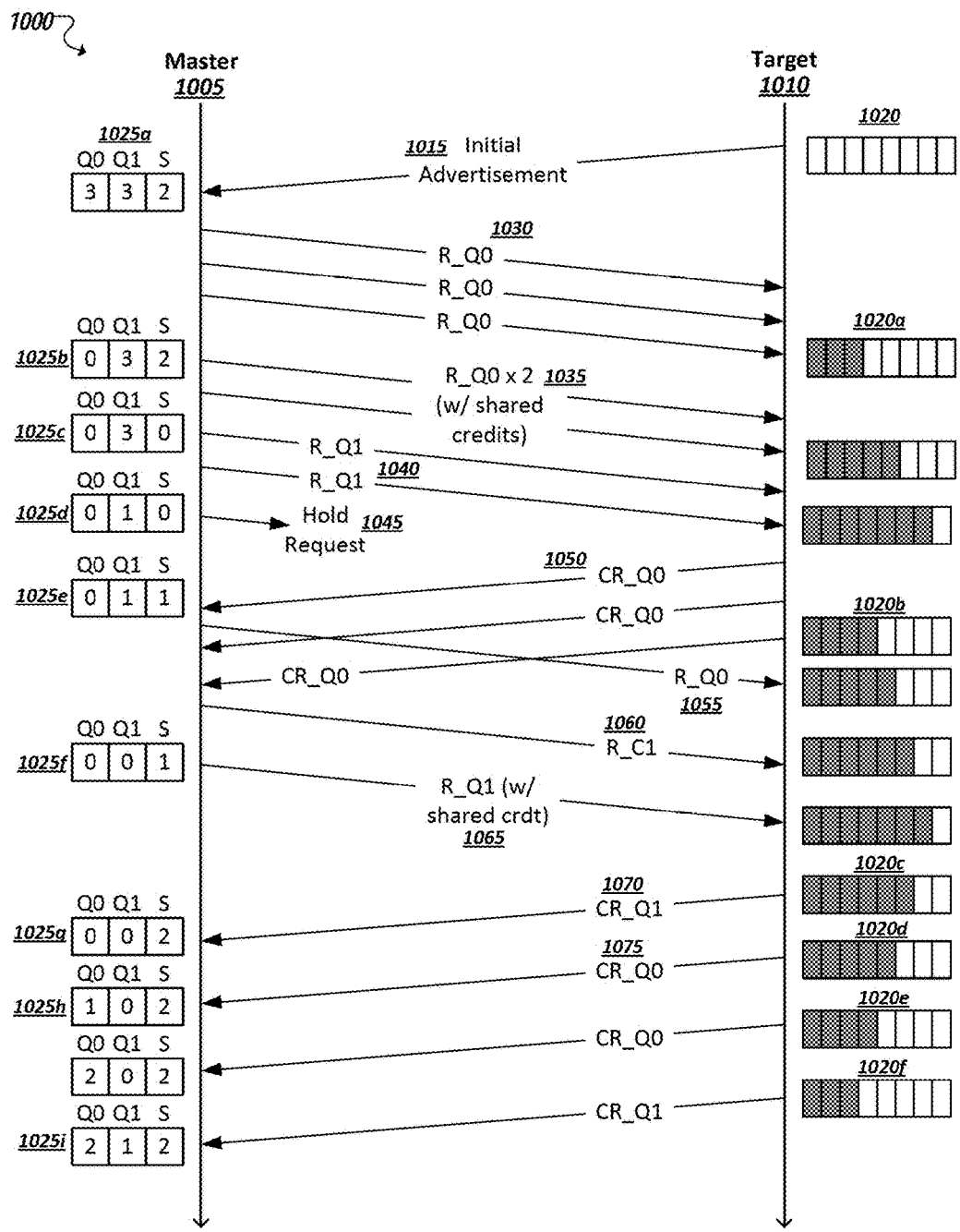
FIG. 10 illustrates a simplified block diagram representing communications according to an example credit-based flow control scheme.

FIG. 10 is a representation 1000 of a simplified example of transactions involving a master 1005 and target 1010 according to a credit-based flow control protocol. Credit initialization 1015 can take place to assign reserved credits to each of a set of channels or queues [Q0, Q1] to indicate the portion of the target's buffer (e.g., 1020) that is to be reserved for each of the queues Q0, Q1. In this example, the buffer 1020 can support eight (8) slots and three of these slots can be reserved for Q0 traffic and another three for Q1 traffic. Accordingly, three (3) reserved credits can be assigned to each of queues Q0 and Q1, with the remaining two slots represented as two initially assigned shared credits (as reflected in credit count 1025a). In some implementations, a protocol can be defined through which signals can be exchanged between master 1005 and target 1010 to communicate and determine how many reserved and shared credits are to be initially assigned.

Continuing with the example of FIG. 10, three packets (R_Q0) can be sent (at 1030) from the master 1005 to the target 1010 using a channel Q0 (i.e., corresponding to queue Q0). The packets can correspond to requests of the target 1010 sent on the channel Q0. As each packet is received at the target 1010, a corresponding slot is occupied (as illustrated by the darkened cells of the representation of buffer 1020a). Further, the master 1005 can decrement its counter to reflect the sent packets. In this example, the sending of the three packets (at 1030) causes three credits to be used. Further, in this example, reserved credits (e.g., Q0) are to be used before any shared credits (S) are used. After the sending of the packets 1030, the master 1005 will have used all of its reserved credits (Q0) (as shown at 1025b). To send an additional packet using channel Q0, with no reserved Q0 credits remaining, the master can use a shared credit S to send the addition R_Q0 packet (at 1035). Accordingly, as shown at 1025c, the shared credits can decrement in response to the sending of packets R_Q0 at 1035. These R_Q0 packets can be sent (1035) to consume the two available shared credits (S). With the Q0 reserved credits and shared credits consumed (as shown at 1025c), additional packets on Q0 cannot be sent (e.g., they are held 1045) until credits are returned for the channel.

Request generation logic and/or flow control logic of the master 1005 can determine the order and priority of packets to be sent. In some cases, ordering rules can be applied causing packets of some traffic classes or request types to be preferred, in certain conditions, over others. Continuing with the example of FIG. 10, R_Q1 packets can be sent, at 1040, using another channel, Q1. As with the sending of R_Q0 packets, sending R_Q1 packets (at 1040) can cause reserved credits for channel Q1 to be decremented (as shown at 1025d). As Q1 credits remain, packets can be sent using channel Q1 despite there being no shared credits (S) (or Q0 credits) (as shown at 1025c).

As noted above, the target 1010 can process packets (R_Q0 and R_Q1) received from the master 1005 and then release the packets from the receiver's buffer. In accordance with slots being made available from the release of these packets, the target 1010 can return credits (e.g., at 1050). The credits can be returned on a channel-by-channel basis. For instance, credits can be returned CR_Q0 for channel (or queue) Q0 (at 1050). As the signals CR_Q0, communicating the credit returns, are received at the master 1005, corresponding counters at the master can be incremented. In one example, credits can be first returned to re-fill vacancies of the shared credit pool before incrementing corresponding reserved credits. As shown at 1025e, the first credit return CR_Q0 can cause the empty shared credit counter to be incremented (i.e., before reserved credits Q0 to be incremented. Additionally, with the return of an available shared credit, a R_Q0 packet awaiting a credit can be sent (at 1055) using the newly returned credit. Once, the shared credits are refilled (i.e., to two shared credits (S)), the next credit return CR_Q0 (at 1075) for a particular channel (e.g., Q0) can cause the counter for reserved credits Q0 to be incremented (as shown at 1025h).

The shared credit pool can be used by multiple channels or queues. For instance, in the example of FIG. 10, the sending of R_Q1 (at 1060) causes the last reserved credit for channel Q1 to be consumed (as shown at 1025f). The next packet that is to be sent on channel Q1 can be sent using a shared credit (S) (at 1065), provided shared credits are available. Further, as credits are returned (e.g., at 1070) for channel Q1, the returned credits are likewise to first increment the shared credit counter (at 1025g) until the shared credit pool is refilled before incrementing the reserved credit counter for Q1 (at 1025i).

In one example, in order to count and track reserved and shared credits, a master can be provided with a first set of counters $C_v$ that counts, for each queue v (e.g., each channel-request type combination), the number of reserved credits that are available. The value of each counter can be set to a respective initial value $P_v$ at credit initialization to reflect the number of reserved slots for the queue. As reserved credits are used for a queue v, the corresponding counter $C_v$ is decremented until it reaches 0 (indicating that shared credits are to be used for an additional packet of the corresponding queue). Another set of counters $U_v$ can be provided for each queue v to count the number of credits, both reserved and shared, currently being used for packets of the queue v. These "use counters" can count to a value past the initial value of the reserved credits, but may not exceed a value exceeding the initial reserved credits value plus the total number of shared credits for the target. Further, a third counter S can be provided to track the available shared credits. As with $C_v$, an initial value for S can be set at credit initialization. The initial value of S can be set to reflect those slots of the receiver buffer that are remaining after assignment of the reserved slots for the supported queues. Further, as shared credits are used, S is to be decremented. When shared credits are returned, S is to be incremented.

Continuing with the previous example, $U_v$ is the number of slots in the receiver buffer currently being used by a given queue v, including packets in transition (i.e., packets being sent from master to receiver, or whose credit is being returned to a master after the freeing of a slot). A "minimal resource guarantee" (MRG) for queue v can be defined so that the MRG is satisfied when $U_v+C_v \geq P_v$. In other words, it must be guaranteed that at any time, queue v is able to be using at least $P_v$ slots in the receiver buffer if it has enough packets to send; if fewer than $P_v$ slots are currently in use ($U_v<P_v$), there must be enough reserved credits for the difference ($C_v \geq P_v - U_v$) so that the master cannot be blocked from sending available packets for queue v until at least $P_v$ slots are in use. When fewer slots are in use, the master credits have been over-allocated and reserved slots of the receiver remain unused. Such instances can serve as the basis for changing the number of slots to be reserved for the queue (e.g., during the next instance of a credit initialization).

As noted above, if a master has a packet in a queue v, it needs either a reserved or shared credit to send the packet to the receiver. The master flow control logic can determine which available packets are eligible to be sent according to this criterion, and choose one from among the eligible packets using defined selection criteria (e.g., traffic class or request type ordering rules, among other examples). Continuing with the previous example, if the packet selected is for queue v, the master increments $U_v$ to record that one more slot is being used by v. The master likewise consumes a credit: if $C_v>0$ then the master consumes a reserved credit and decrements $C_v$, else the master consumes a shared credit (if available) and decrements S. The value of ($U_v+C_v$) either stays the same (i.e., when a reserved credit is used) or increases by 1 (i.e., when a shared credit is used), such that the minimal resource guarantee remains satisfied.

When a receiver receives a packet, the receiver moves the packet to one of the free slots in its buffer. The queue identifier (QID) can be attached to the packet and this identified can be attached to the packet as stored in the buffer slot. When the receiver frees the slot, it retrieves the queue identifier v stored with the slot, and sends a signal indicating that a credit is being returned for queue v. Upon receiving this signal, the master can decrement $U_v$ to record that one slot fewer is in use by the queue v. The master can then decide which credit counter to increment. If decrementing $U_v$ causes the MRG to be violated (i.e., $U_v+C_v<P_v$ following the decrement), the master can increment $C_v$ such that the MRG remains satisfied. Otherwise, the master can increment the shared count S. In other words, the master can treat a returned credit as shared unless doing so would violate the MRG.

In an alternative implementation, determination logic of the master can be simplified. For instance, in one example, the reserved credit counters $C_v$, and shared counter S can be maintained, but the master's in-use counters ($U_v$) can be eliminated. The resulting reduction in hardware logic to support the in-use counters would save cost in area and power consumption. However, eliminating the use counters can result in less information available to the master to make decisions regarding how to track its reserved and shared credits. For instance, this can result in a reserved credit counter $C_v$ being incorrectly incremented instead of the shared credit counter S (e.g., when more than $P_v$ slots are already in use by the queue v). If queue v has no further credits to send, the mis-returned credit is effectively removed from the shared credit pool and can block another queue from being able to send packets using the shared credit.

While some of the previous examples show embodiments where credit counters and associated logic are provided at master interface (e.g., $C_v$, S, $U_v$, and $P_v$ maintained at the master) in other implementations, credit counting logic can be provided partially or entirely at the target. For instance, the target can determine whether a shared or channel specific credit is to be used. In such instances, the master could only be provided with $C_v$ or S, while $U_v$ and $P_v$ are maintained at the target (together with shadow copies of $C_v$ or S, as both sides can use these counters to make decisions). In the example where the target is the primary decision maker in the credit-based flow control scheme, the target can make the decision regarding the credit that is to be used and can communicate the decision to the master.

In another alternative implementation, an additional wire can be provided in the physical link to support an additional bit for use in signaling whether a sent packet, or returned credit, pertains to a reserved or shared credit. For instance, when the master sends a new packet over a particular channel, the additional wire can signal a "1" or "0" to indicate that the master is using a shared or reserved credit to send the packet. The value of the bit can be stored with the packet in the slot of the receiver's buffer (along with the associated queue identifier). When the packet is to be released from the slot, the receiver can read the associated bit value and determine whether to return a reserved or shared credit. Accordingly, when the receiver sends a signal to the master to indicate the return of a credit for a given queue, the receiver can also send, on the additional wire, the bit value to indicate whether the returned credit is a reserved or shared credit. A credit return for a given queue can include a queue ID of the corresponding queue. A QID field in a credit return for a shared credit can be omitted or encoded with a null. The master, upon receiving the credit return signal and bit value can determine whether to increment a reserved credit counter or shared credit counter based on the bit value.

With the provision of a dedicated wire for indicating use or return of either a reserved or shared credit, such an implementation can result in one of the queues holding more credits than it can use, again potentially keeping credits from other queues. However, the provision of the additional wire can allow simplification of the master flow control logic for use in tracking reserved and shared credits.

In some instances (such as shown in the example of FIG. 10), a particular queue could consume all of the shared credits in the pool, leaving none for the other queues (e.g., and corresponding traffic classes, request types, etc.). To guard again a single channel or queue monopolizing the shared credit pool, some implementations may define rules to limit the number of shared credits that any given queue (or that particular queues) can take. Such rules can place conditional limits on shared credit usage in some implementations. In one example, a register $M_v$ can be provided to record a maximum credit count for each queue (or generally for all queues). The maximum credit count indicated the maximum number of slots that can be used by the corresponding queue at any given time. In such an implementation, flow control logic of the master can be augmented to consider the value of $M_v$ together with other values, such as values $P_v$, $C_v$, S, $U_v$, etc. For instance, a rule can be defined for determining whether a packet can be sent, such that packets are sent for a queue when (($C_v>0$ OR $S>0$) AND ($U_v<M_v$).

As noted above, packets can vary in size, with the packets of some channels, traffic classes, request types, etc. being larger than others. In some implementations, varying packet sizes can be handled by choosing a unit size and expressing the size of each packet as a multiple of this unit. In such implementations, credit returns from a receiver to a master can include this size along with the queue identifier. The counters in the master can be increased and decreased by this size. The provision of shared credits can complicate the implementation, for instance, where a size greater than 1 unit is to be split between reserved credit and shared credit pools. For instance, if a master sends a packet of size 2 on queue v, and ($C_v$=1), the master can subtract 1 from $C_v$ and 1 from S. Further, the rule for sending a packet can be changed to allow sending when ($C_v$+S)≥size. In an simpler alternative implementation, one counter would be incremented (or decremented) at a time, and the allowed-to-send rule can be trues when ($C_v$≥size) OR (S≥size), among other examples.

In some implementations, a packet can address multiple, separately managed resources in a given target. In such instances, inefficiencies may result if all of the various resources are tied to the same set of credits. For instance, if some packets require only a subset of the resources, or if not all resources are freed at the same time, then a single crediting scheme could lead to some currently-unused resources being blocked. To avoid this, each resource can be controlled with its own set of counters (e.g., $C_v$ and S). Further, flow control logic can manage these multiple counter by combining rules for the different counters. For instance, the rule for sending a packet, (e.g., ($C_v$>0 OR S>0)) may be required to be simultaneously true for all resources required by that packet, among other examples.

Note that the apparatus', methods', and systems described above may be implemented in any electronic device or system as aforementioned. As specific illustrations, the figures below provide exemplary systems for utilizing the invention as described herein. As the systems below are described in more detail, a number of different interconnects are disclosed, described, and revisited from the discussion above. And as is readily apparent, the advances described above may be applied to any of those interconnects, fabrics, or architectures.

Figure 11:
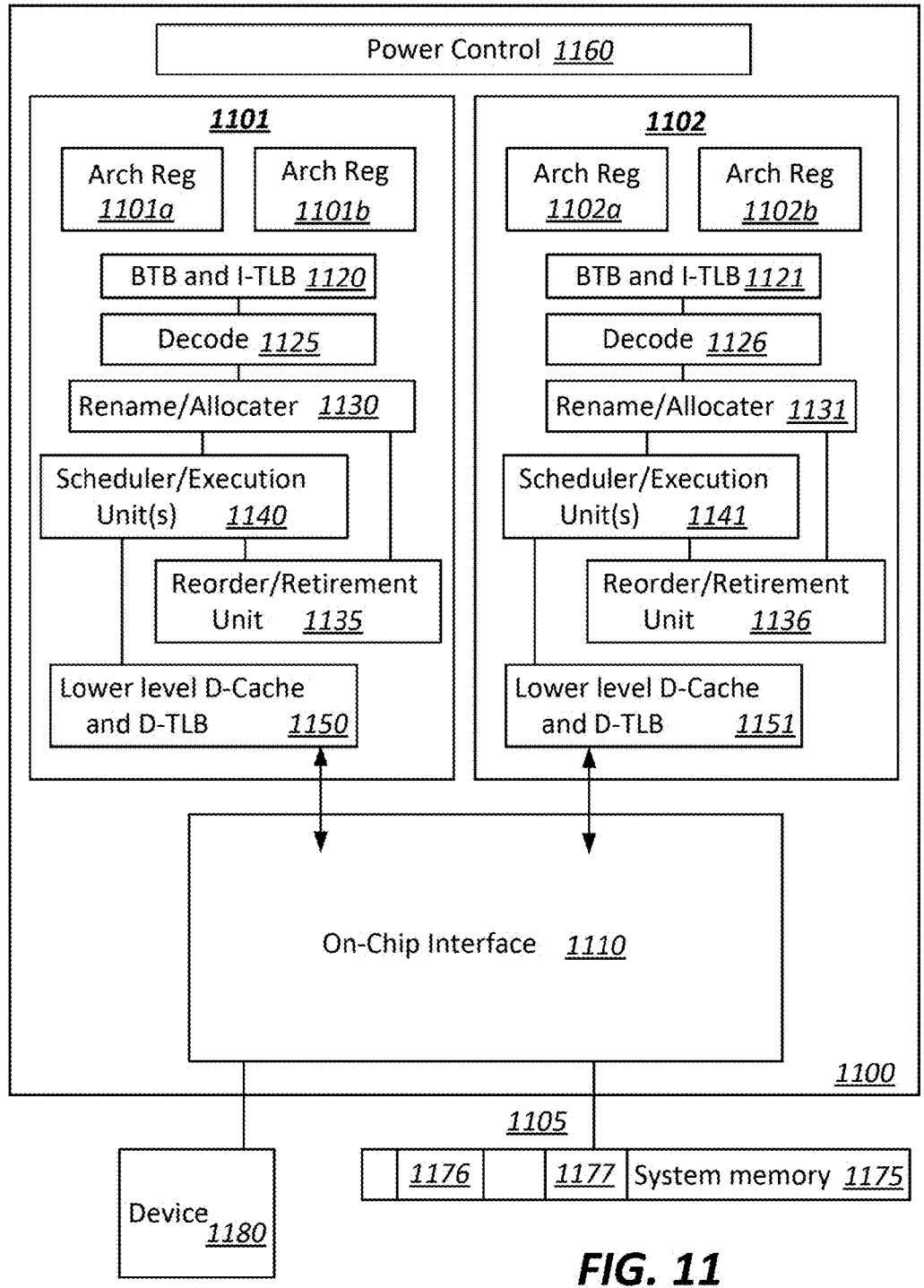
FIG. 11 illustrates an embodiment of a block diagram for a computing system including a multicore processor.

Referring to FIG. 11, an embodiment of a block diagram for a computing system including a multicore processor is depicted. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—core 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 11, includes two cores—core 1101 and 1102. Here, core 1101 and 1102 are considered symmetric cores, i.e. cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 1101 are described in further detail below, as the units in core 1102 operate in a similar manner in the depicted embodiment.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 11, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, as discussed in more detail below decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 1126, in one embodiment, recognize the same ISA (or a subset thereof). Alternatively, in a heterogeneous core environment, decoders 1126 recognize a second ISA (either a subset of the first ISA or a distinct ISA).

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache, such as a second level cache associated with on-chip interface 1110. Note that higher-level or further-out refers to cache levels increasing or getting further way from the execution unit(s). In one embodiment, higher-level cache is a last-level data cache—last cache in the memory hierarchy on processor 1100—such as a second or third level data cache. However, higher level cache is not so limited, as it may be associated with or include an instruction cache. A trace cache—a type of instruction cache—instead may be coupled after decoder 1125 to store recently decoded traces. Here, an instruction potentially refers to a macro-instruction (i.e. a general instruction recognized by the decoders), which may decode into a number of micro-instructions (micro-operations).

In the depicted configuration, processor 1100 also includes on-chip interface module 1110. Historically, a memory controller, which is described in more detail below, has been included in a computing system external to processor 1100. In this scenario, on-chip interface 1110 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 1100. For example in one embodiment, a memory controller hub is on the same package and/or die with processor 1100. Here, a portion of the core (an on-core portion) 1110 includes one or more controller(s) for interfacing with other devices such as memory 1175 or a graphics device 1180. The configuration including an interconnect and controllers for interfacing with such devices is often referred to as an on-core (or un-core configuration). As an example, on-chip interface 1110 includes a ring interconnect for on-chip communication and a high-speed serial point-to-point link 1105 for off-chip communication. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

In one embodiment, processor 1100 is capable of executing a compiler, optimization, and/or translator code 1177 to compile, translate, and/or optimize application code 1176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Figure 12:
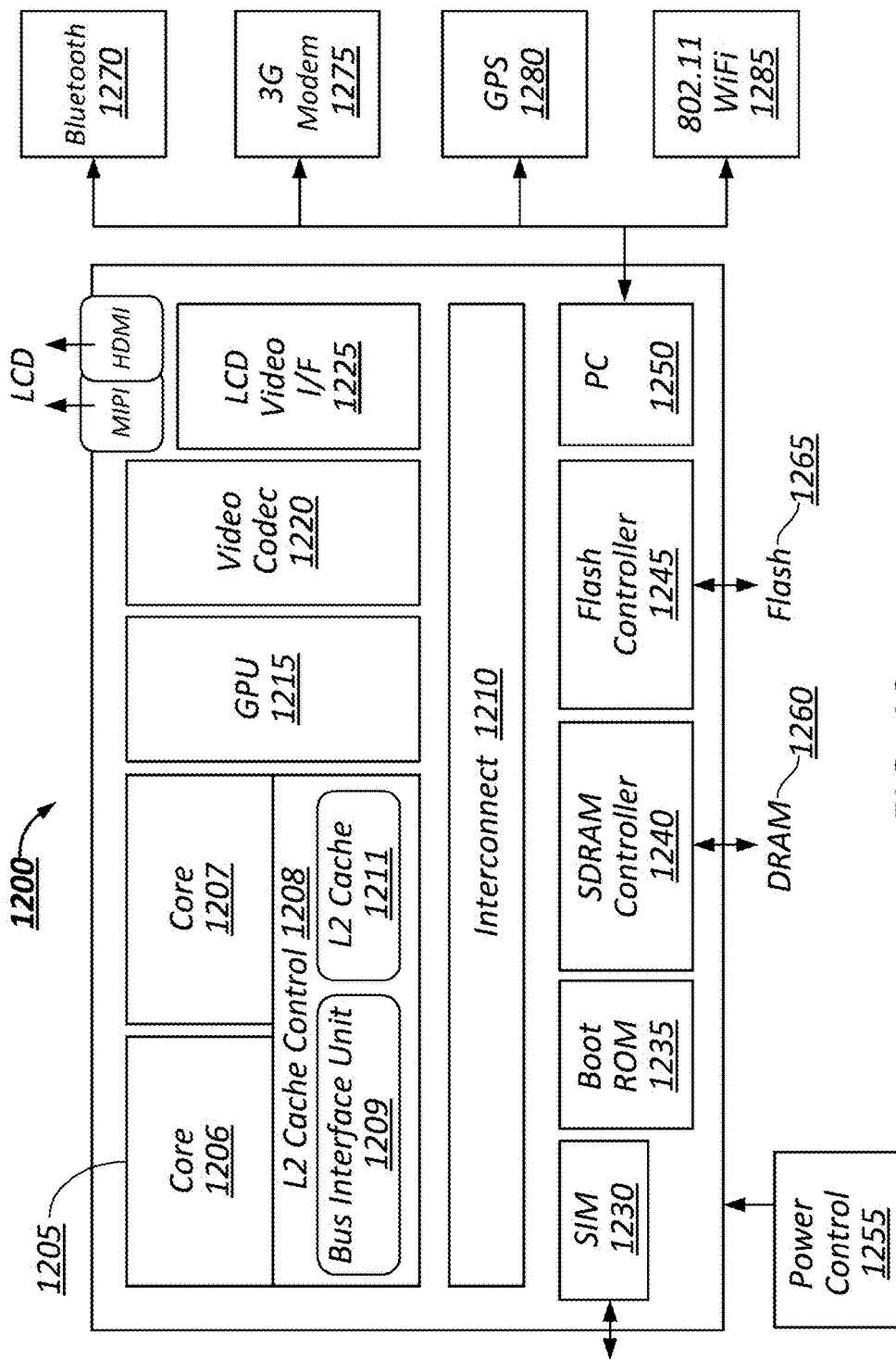
FIG. 12 illustrates another embodiment of a block diagram for a computing system.

Turning next to FIG. 12, an embodiment of a system on-chip (SOC) design in accordance with the inventions is depicted. As a specific illustrative example, SOC 1200 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1200 includes 2 cores—1206 and 1207. Similar to the discussion above, cores 1206 and 1207 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1206 and 1207 are coupled to cache control 1208 that is associated with bus interface unit 1209 and L2 cache 1211 to communicate with other parts of system 1200. Interconnect 1210 includes an on-chip interconnect, such as an IOSF, AMBA, or other interconnect discussed above, which potentially implements one or more aspects of described herein.

Interface 1210 provides communication channels to the other components, such as a Subscriber Identity Module (SIM) 1230 to interface with a SIM card, a boot rom 1235 to hold boot code for execution by cores 1206 and 1207 to initialize and boot SOC 1200, a SDRAM controller 1240 to interface with external memory (e.g. DRAM 1260), a flash controller 1245 to interface with non-volatile memory (e.g. Flash 1265), a peripheral control 1250 (e.g. Serial Peripheral Interface) to interface with peripherals, video codecs 1220 and Video interface 1225 to display and receive input (e.g. touch enabled input), GPU 1215 to perform graphics related computations, etc. Any of these interfaces may incorporate aspects of the invention described herein.

In addition, the system illustrates peripherals for communication, such as a Bluetooth module 1270, 3G modem 1275, GPS 1285, and WiFi 1285. Note as stated above, a UE includes a radio for communication. As a result, these peripheral communication modules are not all required. However, in a UE some form a radio for external communication is to be included.

While the present invention has been described with respect to a limited number of embodiments, those skilled in the art will appreciate numerous modifications and variations therefrom. It is intended that the appended claims cover all such modifications and variations as fall within the true spirit and scope of this present invention.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present invention.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the invention may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. One or more embodiments may provide a method, an apparatus, a system, a machine readable storage, a machine readable medium, hardware-and/or software-based logic, to provide traffic control logic to support a plurality of channels on a link, a plurality of reserved credit counters to each identify reserved flow control credits for a corresponding one of the plurality of channels, and a shared credit counter to identify shared flow control credits to be shared between two or more of the plurality of virtual channels.

In at least one example, shared flow control credits are to be used for sending data on a particular one of the channels when all reserved flow control credits for the particular channel are in use.

In at least one example, a respective in-use counter is provided for each of the plurality of channels, each in-use counter is to track an aggregate number of the reserved credits and shared credits currently in use for packets of the corresponding channel.

In at least one example, each reserved credit counter is to track a number of available reserved credits for a corresponding channel.

In at least one example, each of the plurality of channels is assigned, by a receiver device, an initial amount of reserved credits, and each initial amount is to correspond to an amount of a buffer of the receiver that is reserved to queue packets of the corresponding channel.

In at least one example, the initial amounts of the reserved credits are to be assigned during a credit initialization phase, and an initial number of shared flow control credits is to be determined from the initial amounts of the reserved credits.

In at least one example, the initial amounts of the reserved credits are to be assigned based on a performance history of the plurality of channels on the link.

In at least one example, the shared credit counter is to track a number of available to shared flow control credits for the two or more channels.

In at least one example, flow control logic is provided to determine whether to use a shared credit or reserved credit for a transmission of a packet on a particular one of the plurality of channels based at least in part on a count of the in-use credit counter of the particular channel.

In at least one example, the plurality of channels correspond to a plurality of virtual channels and each of the virtual channels is to correspond to a respective traffic class.

In at least one example, each of the plurality of virtual channels comprise a plurality of request types, and each of the plurality of channels corresponds to a respective virtual channel-request type combination.

In at least one example, ordering logic is provided to determine an order to send packets of two different virtual channels.

In at least one example, flow control logic can receive, from a target, a credit return signal identifying a particular one of the plurality of channels, and determine whether to increment the counter for the reserved flow control credits of the particular channel or the shared credit counter based on the credit return signal.

In at least one example, the shared credit counter is to be incremented if a shared credit was in use by the particular channel at the time the credit return signal is received.

In at least one example, the shared flow control credits are to be available for use by less than all of the plurality of channels.

In at least one example, the shared flow control credits are to be available for use by any of the plurality of channels.

One or more embodiments may provide an apparatus, a system, a machine readable storage, a machine readable medium, hardware- and/or software-based logic, and a method to send packets on a link to a target on a respective one of a plurality of channels supported by the link according to a credit-based flow control protocol, track, for each of the channels, corresponding reserved flow control credits for use in the credit-based flow control protocol, and track for the plurality of channels, a pool of shared flow control credits for use in the credit-based flow control protocol.

In at least one example, a credit return signal is received from the target that identifies a particular one of the plurality of channels, and one of a counter for the reserved flow control credits of the particular channel or a counter for the shared credits based on the credit return signal is incremented.

One or more embodiments may provide a system including a first computing device and a second computing device connected to the first computing device by an interconnect link. The second computing device includes a buffer to queue packets to be received from the first computing device over the link. The first computing device is to send packets on the link to the second computing device using a plurality of channels on the link according to a credit-based flow control scheme. A respective set of reserved flow control credits are to be assigned to each of the plurality of channels, a pool of shared flow control credits is to be provided to be shared between two or more of the plurality of channels, and each of the reserved flow control credits and shared credits represent a portion of the buffer.

In at least one example, the second computing device is to identify when a portion of the buffer used to queue a packet of a particular one of the channels is released and send a corresponding credit return signal to the first computing device, and the credit return signal is to identify the particular channel.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus comprising:
   traffic control logic to support a plurality of channels on a link, wherein the plurality of channels comprise a channel for each one of a plurality of transaction types in each one of a plurality of virtual channels;
   a plurality of reserved credit counters, wherein each of the plurality of reserved credit counters is to identify reserved flow control credits corresponding to a respective one of the plurality of channels, wherein each of the plurality of channels is assigned an initial amount of reserved credits, and each initial amount is to correspond to an amount of a buffer of a receiver device reserved to queue packets of the corresponding channel; and
   a shared credit counter to identify shared flow control credits to be shared between two or more of the plurality of channels.

2. The apparatus of claim 1, wherein shared flow control credits are to be used for sending data on a particular one of the channels when all reserved flow control credits for the particular channel are in use.

3. The apparatus of claim 1, further comprising a respective in-use counter for each of the plurality of channels, wherein each in-use counter is to track an aggregate number of the reserved credits and shared credits currently in use for packets of the corresponding channel.

4. The apparatus of claim 3, wherein each reserved credit counter is to track a number of available reserved credits for a corresponding channel.

5. The apparatus of claim 4, wherein the shared credit counter is to track a number of available shared flow control credits for the two or more channels.

6. The apparatus of claim 5, further comprising flow control logic to determine whether to use a shared credit or reserved credit for a transmission of a packet on a particular one of the plurality of channels based at least in part on a count of the in-use credit counter of the particular channel.

7. The apparatus of claim 1, wherein the initial amounts of the reserved credits are to be assigned during a credit initialization phase, and an initial number of shared flow control credits is to be determined from the initial amounts of the reserved credits.

8. The apparatus of claim 1, wherein the initial amounts of the reserved credits are to be assigned by a software-based manager based on a performance history of the plurality of channels on the link.

9. The apparatus of claim 1, wherein each of the virtual channels is to correspond to a respective traffic class.

10. The apparatus of claim 1, wherein the plurality of transaction types comprise non-posted transactions, posted transactions, and completions.

11. The apparatus of claim 1, further comprising ordering logic to determine an order to send packets of two different virtual channels.

12. The apparatus of claim 1, further comprising flow control logic to:
receive, from a target, a credit return signal, wherein the credit return signal identifies a particular one of the plurality of channels; and
determine whether to increment the counter for the reserved flow control credits of the particular channel or the shared credit counter based on the credit return signal.

13. The apparatus of claim 12, wherein the shared credit counter is to be incremented if a shared credit was in use by the particular channel at the time the credit return signal is received.

14. The apparatus of claim 1, wherein the shared flow control credits are to be available for use by less than all of the plurality of channels.

15. The apparatus of claim 1, wherein the shared flow control credits are to be available for use by any of the plurality of channels.

16. A non-transitory computer readable medium comprising code that, when executed, is to cause a computing device to:
send packets on a link to a target, wherein each packet is to be sent on a respective one of a plurality of channels supported by the link according to a credit-based flow control protocol, wherein the plurality of channels comprise a channel for each one of a plurality of transaction types in each one of a plurality of virtual channels;
track, for each of the channels, corresponding reserved flow control credits for use in the credit-based flow control protocol, wherein each of the plurality of channels is assigned an initial amount of reserved credits, and each initial amount is to correspond to an amount of a buffer of a receiver device reserved to queue packets of the corresponding channel; and
track for the plurality of channels, a pool of shared flow control credits for use in the credit-based flow control protocol.

17. The medium of claim 16, wherein the code, when executed, is to further cause the computing device to:
receive, from the target, a credit return signal, wherein the credit return signal identifies a particular one of the plurality of channels; and
determine whether to increment one of a counter for the reserved flow control credits of the particular channel or a counter for the shared credits based on the credit return signal.

18. A system comprising:
a first computing device; and
a second computing device connected to the first computing device by an interconnect link, wherein the second computing device comprises a buffer to queue packets to be received from the first computing device over the link,
wherein the first computing device is to send the packets on the link to the second computing device using a plurality of channels on the link according to a credit-based flow control scheme, wherein the plurality of channels comprise a channel for each one of a plurality of transaction types in each one of a plurality of virtual channels, a respective initial amount of reserved flow control credits are to be assigned to each of the plurality of channels, each initial amount is to correspond to an amount of a buffer of a receiver device reserved to queue packets of the corresponding channel, a pool of shared flow control credits is to be provided to be shared between two or more of the plurality of channels, and each of the reserved flow control credits and shared credits represent a portion of the buffer.

19. The system of claim 18, wherein the second computing device is to identify when a portion of the buffer used to queue a packet of a particular one of the channels is released and send a corresponding credit return signal to the first computing device, and the credit return signal is to identify the particular channel.

* * * * *